United States Patent
Kukla et al.

(10) Patent No.: US 11,960,816 B2
(45) Date of Patent: Apr. 16, 2024

(54) AUTOMATIC DOCUMENT GENERATION AND SEGMENTATION SYSTEM

(71) Applicant: RedShred LLC, Baltimore, MD (US)

(72) Inventors: James M. Kukla, Ellicott City, MD (US); Maryam Esmaeilkhanian, Ellicott City, MD (US)

(73) Assignee: RedShred LLC, Baltimore, MD (US)

( * ) Notice: Subject to any disclaimer, the term of this patent is extended or adjusted under 35 U.S.C. 154(b) by 0 days.

(21) Appl. No.: 17/577,793

(22) Filed: Jan. 18, 2022

(65) Prior Publication Data

US 2022/0229969 A1 Jul. 21, 2022

Related U.S. Application Data

(60) Provisional application No. 63/138,074, filed on Jan. 15, 2021.

(51) Int. Cl.
*G06F 40/103* (2020.01)
*G06F 40/166* (2020.01)
*G06N 3/08* (2023.01)
*G06V 30/412* (2022.01)

(52) U.S. Cl.
CPC .......... *G06F 40/103* (2020.01); *G06F 40/166* (2020.01); *G06N 3/08* (2013.01); *G06V 30/412* (2022.01)

(58) Field of Classification Search
CPC .............................. G06F 40/166; G06F 40/103
See application file for complete search history.

(56) References Cited

U.S. PATENT DOCUMENTS

| | | | |
|---|---|---|---|
| 5,701,500 A * | 12/1997 | Ikeo et al. | G06T 1/00 |
| 6,356,909 B1 | 3/2002 | Spencer | |
| 6,598,015 B1 | 7/2003 | Peterson | |
| 8,903,646 B2 * | 12/2014 | Althen | H04L 9/00 |
| 9,372,840 B1 * | 6/2016 | Golchha et al. | G06F 17/2264 |
| 10,075,482 B2 | 9/2018 | Chinnapatlolla | |
| 2004/0243633 A1 | 12/2004 | Thompson | |
| 2005/0041860 A1 | 2/2005 | Jager | |
| 2005/0050054 A1 | 3/2005 | Clark | |
| 2005/0165642 A1 | 7/2005 | Brouze | |
| 2005/0256844 A1 | 11/2005 | Cristol | |
| 2006/0235831 A1 | 10/2006 | Adinolfi | |
| 2006/0242159 A1 | 10/2006 | Bishop | |
| 2008/0037052 A1 * | 2/2008 | Nishiguchi | G06K 15/00 |
| 2008/0046838 A1 | 2/2008 | Haub | |
| 2008/0235271 A1 | 9/2008 | Wang | |
| 2008/0243479 A1 | 10/2008 | Cafarella | |
| 2008/0270380 A1 | 10/2008 | Ohrn | |
| 2010/0082177 A1 | 4/2010 | Chang | |
| 2011/0137898 A1 * | 6/2011 | Gordo et al. | G06F 17/30 |
| 2011/0258195 A1 * | 10/2011 | Welling et al. | G06F 17/30 |
| 2011/0258213 A1 | 10/2011 | Pollara | |

(Continued)

*Primary Examiner* — James J Debrow
(74) *Attorney, Agent, or Firm* — Butzel Long

(57) ABSTRACT

Methods and systems are provided for generating a corpus of documents from an original document or document corpus. Original documents are processed to extract document layout and elements. Elements are clustered and processed by neural networks, such as GANs, to generate additional elements that are then combined with the extracted layout to produce new documents, such as for training automated document processing systems.

14 Claims, 6 Drawing Sheets

(56) References Cited

U.S. PATENT DOCUMENTS

| | | |
|---|---|---|
| 2012/0284199 A1 | 11/2012 | Lundberg |
| 2013/0046782 A1 | 2/2013 | Lee |
| 2015/0100594 A1* | 4/2015 | Hess et al. ........ G06F 17/30076 |
| 2017/0052944 A1 | 2/2017 | Choudhry |
| 2017/0132203 A1 | 5/2017 | Kim |
| 2018/0219827 A1 | 8/2018 | Agathangelos |
| 2020/0012851 A1* | 1/2020 | Stanley et al. ........... G06K 9/00 |
| 2021/0158093 A1* | 5/2021 | Kaynig-Fittkau et al. |
| 2022/0229969 A1* | 7/2022 | Kukla et al. .......... G06F 40/103 |

* cited by examiner

AUTOMATIC DOCUMENT GENERATION AND SEGMENTATION SYSTEM

CROSS-REFERENCE TO RELATED APPLICATIONS

This application claims the priority benefit of U.S. Provisional Patent Application No. 63/138,074, filed Jan. 15, 2021, the disclosure of which is incorporated by reference in its entirety.

BACKGROUND

The number, type, and structure of documents in various domains is continuously increasing. Reading, analyzing, and interpreting a wide variety of documents by humans can be a tedious task, especially in industries and other contexts that use lengthy documents providing a great deal of information.

Conventional techniques for processing certain types of documents, such as technical manuals, grant proposals, Request for Proposals (RFPs), and the like, typically include downloading individual files from multiple online sources and editing them with a variety of desktop computer applications such as Adobe Acrobat, Microsoft Word, and the like. In many cases, documents must be opened, searched, and processed before the contents of the document can be used, such as downloading and reading RFPs or bids and editing these documents to develop associated market reports. As another example, it may be desirable to make educational content accessible in augmented- or virtual-reality contexts, or to align various and disparate manual sources for engineering troubleshooting. In all of the scenarios, both manual visual search and keyword search are used to find areas of interest by using primitive keyword search techniques to find areas of interest by guessing at the wording that may be used inside each particular document. These activities may be repeated across many documents from many different sources, which generally will not be in a common format or structure.

SUMMARY

Embodiments disclosed herein provide workflows for automatic documents generation and corresponding annotation generation systems.

Embodiments disclosed herein may help users to access more data within documents and their segmented sections, as well as accessing more than the basic data within the documents, without any need of human intervention for annotating the data.

Embodiments also include computer implemented techniques including individual subsystems that are responsible for completing different tasks while a combination of those small parts create the entire system.

According to embodiments disclosed herein, a corpus of documents may be received by a first subsystem which converts the pages of received documents to images. The first subsystem also may process the incoming documents and/or document images via classification or other means to cluster them into groups based on the appearance of the page, for example to help a user distinguish the variety of page layouts in the corpus separately from the document content. The document images may be transferred to a second subsystem, which decomposes the images of pages to elements and layout structures. The second subsystem may store information defining the location of each element in the pages.

In an embodiment, a third subsystem may receive extracted document elements from the second subsystem. This subsystem may place all the extracted elements into an embedding space to cluster them. After clustering the elements, a label may be assigned to each cluster in which all of the elements are grouped as similar elements.

The extracted layouts generated as output by the second part of the system may be annotated, such as via color schemes, based on the assigned labels on the cluster and the information of elements' locations.

One or more deep neural networks may be used to generate more samples of the documents in addition to their annotations. The neural networks may manage receiving all of the elements and colored layouts of documents and may generate new layouts based on them.

Multiple networks may be used, in which every group of clustered elements or layouts are assigned to one network, which then generates more of that specific input. Examples of specific deep neural networks suitable for use with the present disclosure include generative models such as Generative Adversarial Networks (GANs) which are capable of generating more samples from the distribution of the input collection.

A combination of the newly generated elements and annotated/colored layouts may be used to produce new documents and corresponding annotations, which are outputs of the disclosed system.

Embodiments and subsystems disclosed herein may be implemented on one or more computing components and/or networks.

DETAILED DESCRIPTION

Figure 1:
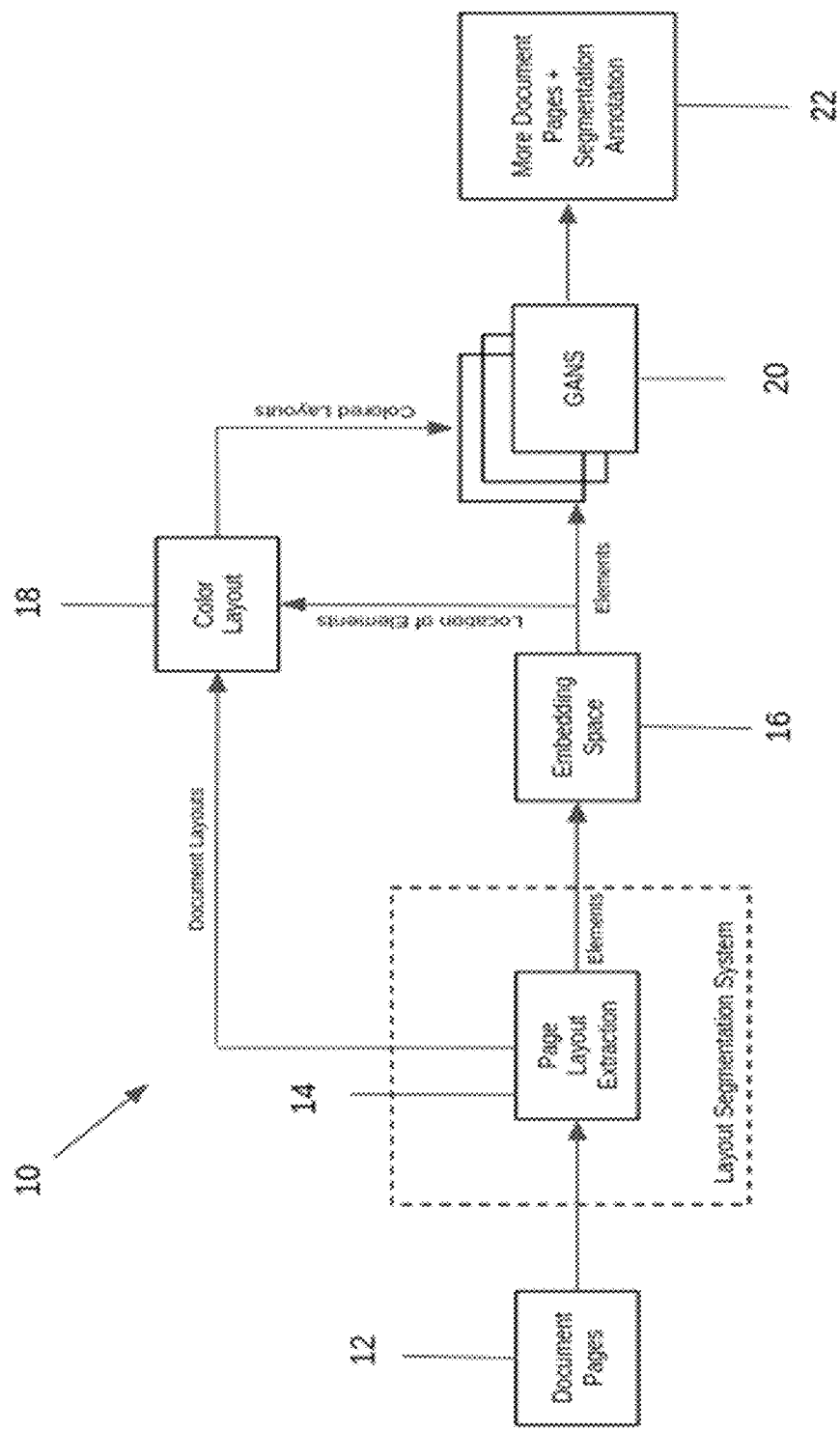
FIG. 1 show a schematic view of an example document generation and segmentation system as disclosed herein.

As used herein, an "annotation" of a document includes a decomposition of the document into distinct sections, such as Title, Paragraph, Picture, and the like. An "annotation" also may include other indicators of document structure or content type, such as structure blocks. Annotations may be shown using labels, images, colors, or combinations thereof.

Embodiments disclosed herein may be used to generate a corpus of training documents based on one or more original documents, which then may be used to create, modify, or train other document processing systems. Non-limiting examples of such document processing systems are described in U.S. Pat. No. 10,810,240, the disclosure of which is incorporated by reference in its entirety. The generation of a training corpus may be useful, for example, where the original documents are limited in number, availability, or the like, such that it is not practical or possible to train a machine learning or similar system on only the original documents.

One approach to automatic processing, analysis, and understanding of documents is to intelligently segment documents to smaller parts such as heading, paragraph, table, footer, header, pictures. Recently, there have been attempts to make the task of understanding documents as smart as possible using deep learning methods. Deep learning methods require an extensive amount of annotated data to train a model for a specific task. Different approaches have been used to segment documents intelligently using deep learning methods which require a lot of annotated data to train a model for a task. Document annotation in this context typically is a labor-intensive task since it should be done by humans.

In addition, documents from different domains may have different structures. It generally is not possible to ask the model to make predictions based on documents from a domain which the models have never been trained on before and obtain results as accurate as when the training set matches the distribution of documents seen in actual use; that is, a model trained on documents from one domain may be less useful or not useful at all when analyzing documents from a different domain. To that end, the present disclosure provides new systems and methods in which documents are given as input and the system outputs annotated documents with different specific segments to accelerate the adaptation of these models to new domains. This synthetic data augments the available labelled data for training new models.

For example, embodiments may operate by accepting documents as input, converting the pages of the documents into images, clustering those pages by layout appearance, analyzing the sections inside the document pages, clustering the elements into the groups of elements to gain the label for them, generating the elements as well as document layouts, and associating new elements to new generated layouts in order to produce additional, automatically-annotated, segmented documents. For instance, embodiments disclosed herein may be provided with a collection of documents such as technical manuals, engineering documentation, research papers, scientific papers, or the like, and a set of element names such as text and non-text, or heading, figure, table in order to generate more documents with the same distribution as the original inputs as well as the segmentation masks. Segmentation masks are the colored layouts of documents that can have different colors based on the label of elements.

FIG. 1 shows an overview of an example system as disclosed herein. The document processing system 10 includes 6 subsystems. Each subsystem may operate separately, and the output of the subsystem may be the input to the next subsystem. Subsystems may be implemented on a common computing system, or one or more may be implemented on independent and separate computing systems, in any desired combination. More generally, a subsystem as shown and disclosed herein may be considered a logical grouping, which in various embodiments may be implemented separately (logically and/or physically) from other subsystems, or which may be combined (logically and/or physically) with any number of other subsystems. The example shown in FIG. 1 includes a document intake subsystem 12 to receive the documents and convert them to images.

A layout segmentation subsystem 14 then takes the output images from the first subsystem 12 as inputs and extracts the layouts and elements of them using a layout extraction system as disclosed herein. This subsystem also may track the location of the extracted elements. The obtained elements may be fed to an embedding space subsystem 16, which clusters the elements into different groups. At this stage, groups of elements may be assigned one or more labels based on the features of the elements as disclosed in further detail herein. The labelled elements, the element location information, and the associated layouts may then be provided to a layout coloring subsystem 18 to produce colored segmentation masks.

One or more independent networks 20, such as GANs, may then generate more samples of the input. The generated samples may include segmented layouts and groups of elements with the same label.

After generating the new masked layouts and elements, an annotation subsystem 22 may combine them to create new documents. These new generated documents and the masked layouts are provided as the output of the composite system. As disclosed in further detail herein, these generated documents may be used in situations where original or actual document corpora are not available or cannot be directly accessed.

The input documents received by the initial subsystem 12 may be transmitted to the system directly by users, or they may be received via automated or semi-automated processes that collect documents into a corpus. For example, documents can be fed to the system through an API. The system may support multiple document formats such as PDFs, OCRs, Microsoft® Word documents, and the like, and generally is not limited to processing any particular format of document. The documents may be converted to images of pages which can be any format of images such as PNG, JPG, and the like. To convert the documents into page images, external tools such as pdf2ppm may be used.

Some default options for labeling the final output may be provided to the users, for example to allow direct selection of one or more suitable options based on the task the users want to solve. The following options are examples of the set of labels that may be provided to user:

Text and Non-Text;
Heading, Figure, Body Text;
Heading, Table, Body Text, Figure.

As a specific example, an "academic paper" document may include the following elements, which may be assigned corresponding labels: title, author, abstract, text, figure, and cited references.

These examples are intended to be illustrative and are not limiting on embodiments disclosed herein; more generally, any suitable set of labels may be applied to documents generally or to specific sets of documents. Moreover, users may define the final format of the generated documents as well as the annotations which are the final output of the system.

Figure 2:
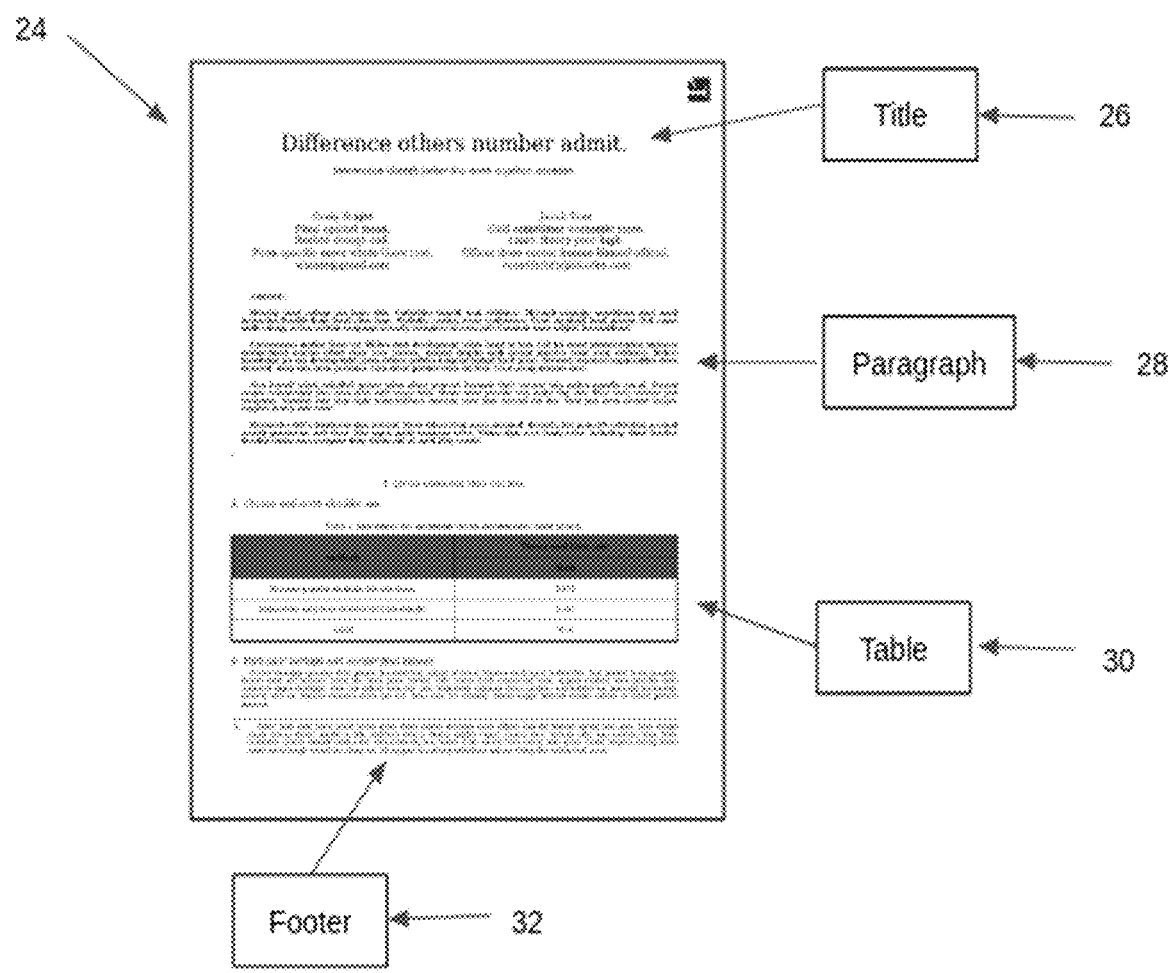
FIG. 2 shows an example of overall sections of a sample document page as disclosed herein.

FIG. 2 shows an example of an input 24 to the system, such as may be received by the intake subsystem 12. In this example, the document includes the following elements which may be extracted by the system: Table 30, Paragraph 28, Title 26, and Footer 32. Elements present in specific documents may vary and documents processed by a particular embodiment may include more or fewer elements, though in some embodiments it may be expected that documents of common type, source, or use may be likely to have common sets of elements. For example, for a corpus of documents that includes documents of a single type, each document may be expected to have elements from a common set, even where individual documents do not include elements of every type. As a specific example, technical manuals often discuss parts, procedures, and the like, while a food product label typically presents pre-defined types of nutrition information, ingredients lists, and the like.

Referring again to FIG. 1, each page of a document may be converted into an image and provided to the next level of the system 14 for further processing. For instance, if the input to the system includes one document with 30 pages, the intake subsystem 12 may generate 30 individual images, each corresponding to a single page of the document. The 30 images then may be input to the page layout extraction subsystem 14, which may cluster the 30 images may to group them by layout. Alternatively, the document may be converted to fewer than 30 images, some or all of which may include multiple pages of the document. Various pre-processing also may be performed by the intake subsystem, such as to remove blank pages, convert pages to a common size, remove duplicate pages, or the like.

The page layout extraction subsystem 14 extracts elements of documents based on the features of the documents. For example, the subsystem 14 may apply a vision-based segmentation model to each page of the document. Alternatively, or in addition, a simpler approach based on separating content based on greater-than-line-height spans of background color (often referred to as "whitespace" since it usually appears white on a standard page) may be used. In some embodiments, the extraction subsystem may apply rules to make sure the decomposition of the documents is acceptably precise and accurate, for example to make sure that the edges are clearly defined, the defined location of elements do not overlap each other, and the like. For example, rules may require that a "clearly defined" edge of an element is placed entirely within whitespace around an element, without crossing or otherwise overlapping the defining element or any other elements. Similarly, the rules may prevent the extracted elements to from being so fine-grained that they may not correspond to elements that would be expected in other similar documents.

Figure 3:
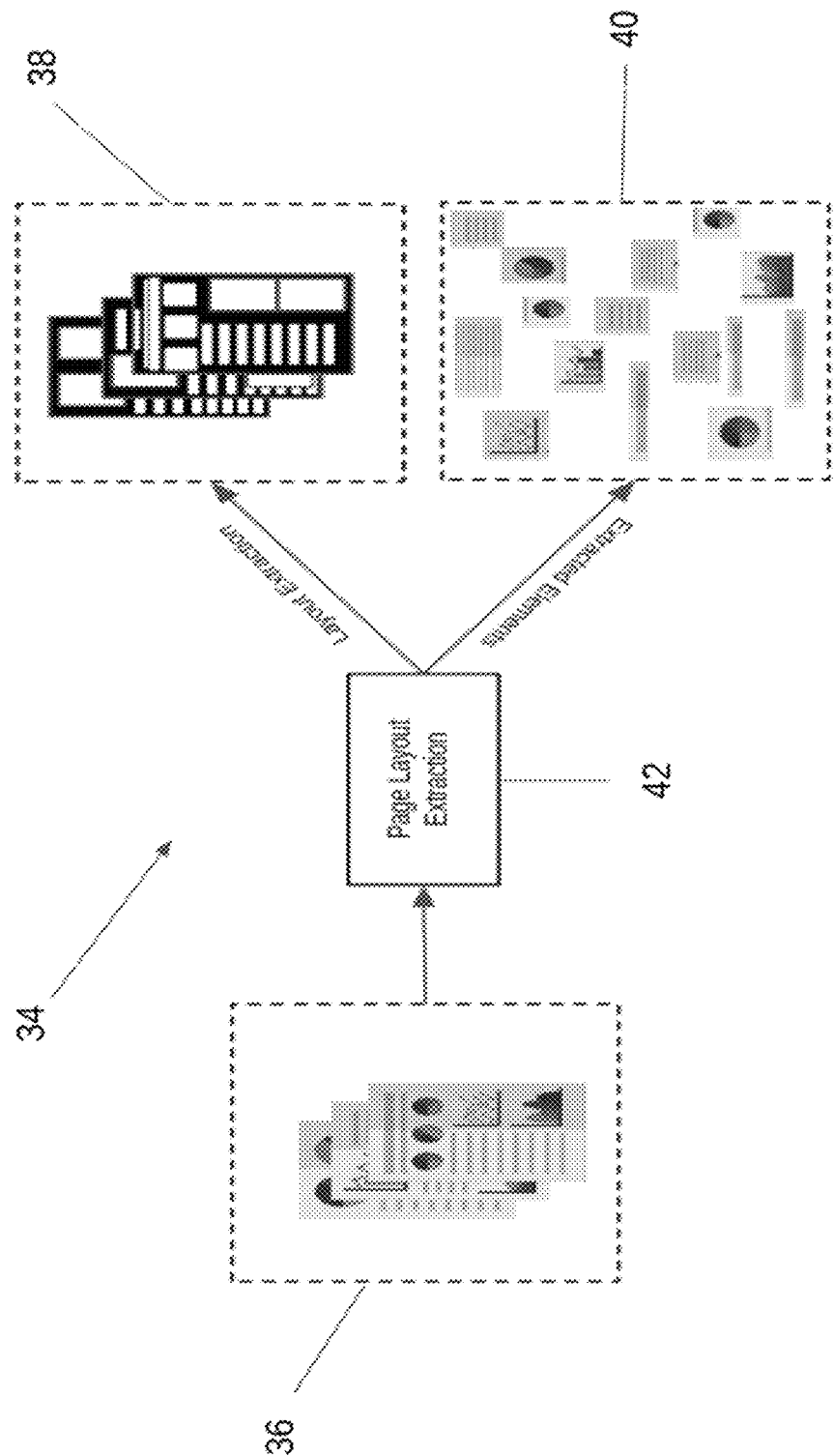
FIG. 3 shows an example logic flow for document layout segmentation as disclosed herein.

FIG. 3 shows an example of a page layout extraction subsystem 14. In this system and process, a collection of page images 36 are received as the output of the document intake system as previously disclosed. The documents can have any combination of elements. The subsystem 14 decomposes the pages into separate sections by finding the elements in the documents. For example, a machine learning model may be used to detect elements in the documents, such as a prior iteration of the model being trained by output of the system 10. As another example, the elements may be detected using blob detection algorithms such as those used for image processing in MSER and similar applications, and/or using a rules-based system. Rules may, for example, consider the distance between neighboring elements to compute distributions in X and Y coordinates and then use that distribution to tune a threshold for what constitutes inter-element spacing vs. intra-element spacing, such as to identify appropriate sections of whitespace as previously disclosed.

From this process, the layout 38 of each document as well as the individual elements 40 in the document are extracted. Note that the system typically does not have any information about the label of the elements yet. This subsystem knows the location of each extracted element and it stores this information in order to use that later for creating the colored layouts. The output of the page layout extraction subsystem 14 may be considered as a combination of two components. First, the layout 38 provides a page "template" that describes the arrangement of elements on the document page. The layout 38 generally is independent of the content in each component; rather, it describes the relative size and arrangement of elements on the page. The elements 40 are separately identified and extracted independently of their size and position. For example, a document may include a header element at the top of the page, a footer element at the bottom, a text element, and an inline image placed at a specific location on the page, with the text element arranged partially or entirely surrounding the inline image. Although in many text- and image-based document the elements may be rectangular, more generally elements can be of any shape, including arbitrary polygons. The layout 38 for this example document shows the positioning and size of the header, footer, image, and text without any associated content. The extracted elements include the content within the header, footer, text, and image. The elements may be stored and processed as individual images, the same types of which may have the same or similar style or form when considered in the abstract. For example, a "mailing address" element in a business letter or similar document generally has the same basic structure of whitespace and text or other non-whitespace. Such an element may not be treated as text per se at this point of the process, but it may be identified as having a particular type of structure.

This process may be particularly useful for structured documents, web pages, and the like. For example, a product page on an e-commerce site typically has the same type of information in the same locations, such as price information, main image, detailed description, user review, and the like. Embodiments disclosed herein preserve this kind of information for the extracted elements while also maintaining the layout of the document page itself, independently of the information in each element. That is, once the document layout and elements are extracted, the layout may be processed, analyzed, and used to generate new documents without relying on the actual content of each original element.

Some very structured documents in some domains may benefit less from such an analysis because they have very clearly-defined structures, such as where documents must conform to a rigid template, since there would be less variance in the underlying distribution of layouts and elements. However, the techniques disclosed herein may still be successfully applied to such domains. Embodiments disclosed herein allow for the capture and analysis of "messier" document layouts, such as in domains where documents are often similar in form and/or content, but where no rigid template is required. Based on the locations of elements in the original document layouts, embodiments disclosed herein may determine that a particular type of document usually has images in a particular location, various forms of text in other locations, and the like.

Elements extracted from documents may be fed to an embedding space subsystem 16. In this process and system, the cropped elements in image format may be passed to a deep neural network which has been previously trained on a set of documents. In cases where the model was trained on different data than the document being processed by the subsystem, some low-level learned features, such as edge detectors and the like that have shown value in transfer learning systems, may be used to convert the images to semantically meaningful vectors. Then a dimensionality reduction technique such as UMAP, T-SNE, or the like may reduce the number of dimensions of the vectors and inject them to an embedding space. Next the embeddings may be plotted to show groups of similar elements referred to as clusters. Clusters may be identified and defined using conventional clustering algorithms, for example by taking page images or element images and converting them to vector representations that can be manipulated using such algorithms. Any suitable clustering algorithm may be used. By plotting the vectors, it is also possible to visualize the clusters as well as assigning a label to them. In some embodiments, the clusters may be evaluated by a human reviewer or an automated process to assign a label to each. As a specific example, each page image or element image may be converted into a vector in an n-dimensional space. The space can be projected down onto a 2D plane or a 3D volume (for interactive 3D graphics or AR/VR) to be visualized. Each colored point in such a visualization may represent an image that has been organized conceptually by the embedding process as previously disclosed, such that things that are semantically similar are closer to one another, and those that are semantically more different are farther apart. This results in regions of the visualized vector space that have commonality—in this case, document layout. Such visualizations may assist users in quickly reviewing and labeling data to understand the types of page segments present in the document. For example, a cluster may be observed in a 2D or 3D visualization that is physically separate from other aggregations of data points, which may be observed by a human or automated review process. Upon examining a representative sample of elements in the cluster, it may be determined that the elements all in the cluster are, for example, mailing addresses or another common type of data, at which point they may be annotated as such in bulk based upon the spatial relationship.

Figure 4:
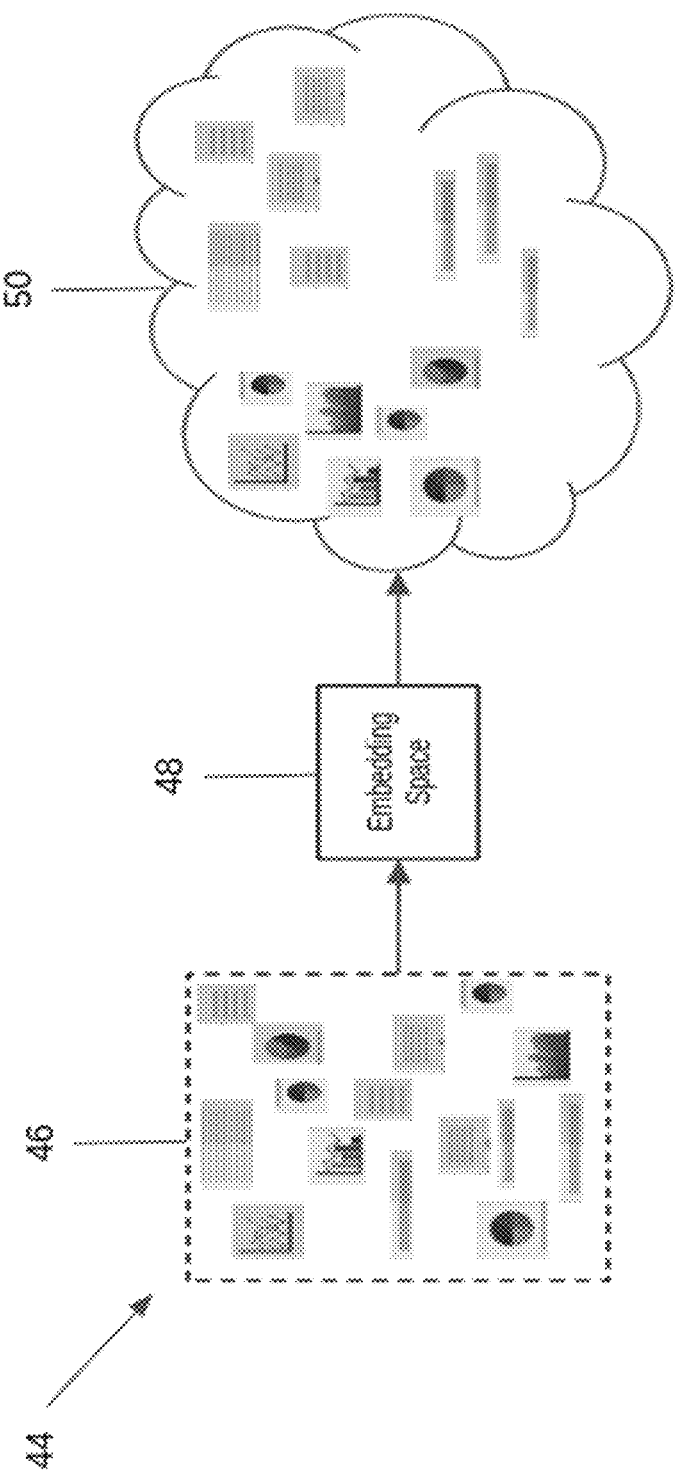
FIG. 4 shows an example of inputs and outputs to an Embedding Space as disclosed herein.

FIG. 4 shows an example of the embedding space workflow and system. The input data to this system are document elements 46, such as the elements 40 extracted by the extraction subsystem 14. At this point no label has been assigned to the elements. After the elements are grouped into clusters 50, one or more labels may be assigned to each cluster. For example, each cluster may be labeled as "Figure", "Paragraph", "Heading", and the like, to indicate the type of element within the cluster.

Figure 5:
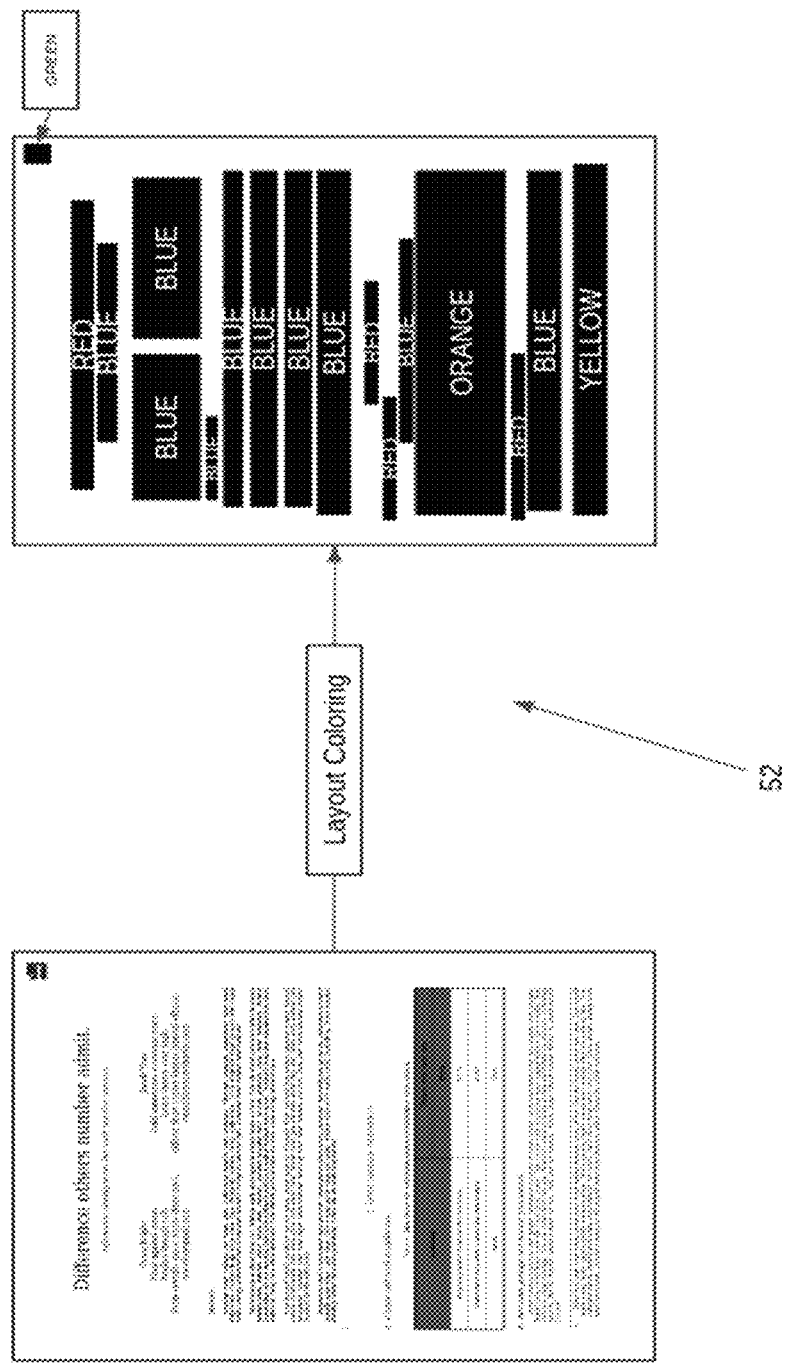
FIG. 5 shows an example of input and output of a layout coloring subsystem as disclosed herein.

After labels are assigned to elements based on their cluster, a layout coloring subsystem 18 may assign various colors to the location of the extracted sections in the layout 38. For example, the subsystem may create layouts segmented to different colors based on the labels of each section and the information about the location of each element which was stored by the page layout extraction subsystem 42. An example of a colored layout is shown in FIG. 5. The output of the subsystem 52 is an image in which each section is assigned a label to indicate the color of that section. This is just an example and the colors assigned to each piece can be different than the example colors shown in FIG. 5. Alternatively, instead of creating a color mask, information about the location and the label of each section may be stored in other formats, such as JSON.

Figure 7:
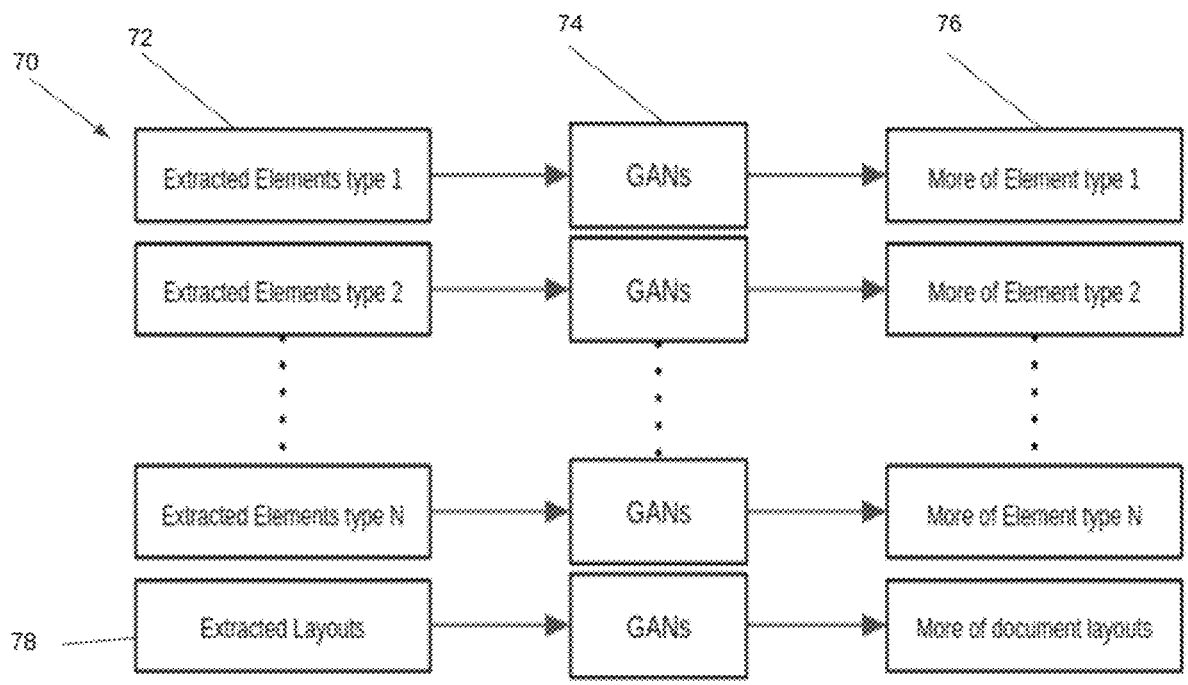
FIG. 7 shows an example of a logic flow for producing new documents as disclosed herein.

One use of embodiments disclosed herein is to generate new documents that can be used for training inputs for document analysis and classification systems. To generate a new document, new elements and layouts are generated. Referring to FIG. 7, a group of clustered elements having the same label 72 may be provided as input to a GAN network 74 to generate more of the same type of element 76, which may be combined with generated layouts to create actual documents in addition to the segmented annotations. The input to this system can be documents from any domain. As previously disclosed, in some embodiments a user may choose a set of elements for documents to be segmented into. For example, for a particular application a user may select "title, paragraph, and picture" for the segmentation, while for a different application the user may select only "Text and Non-Text".

Figure 6:
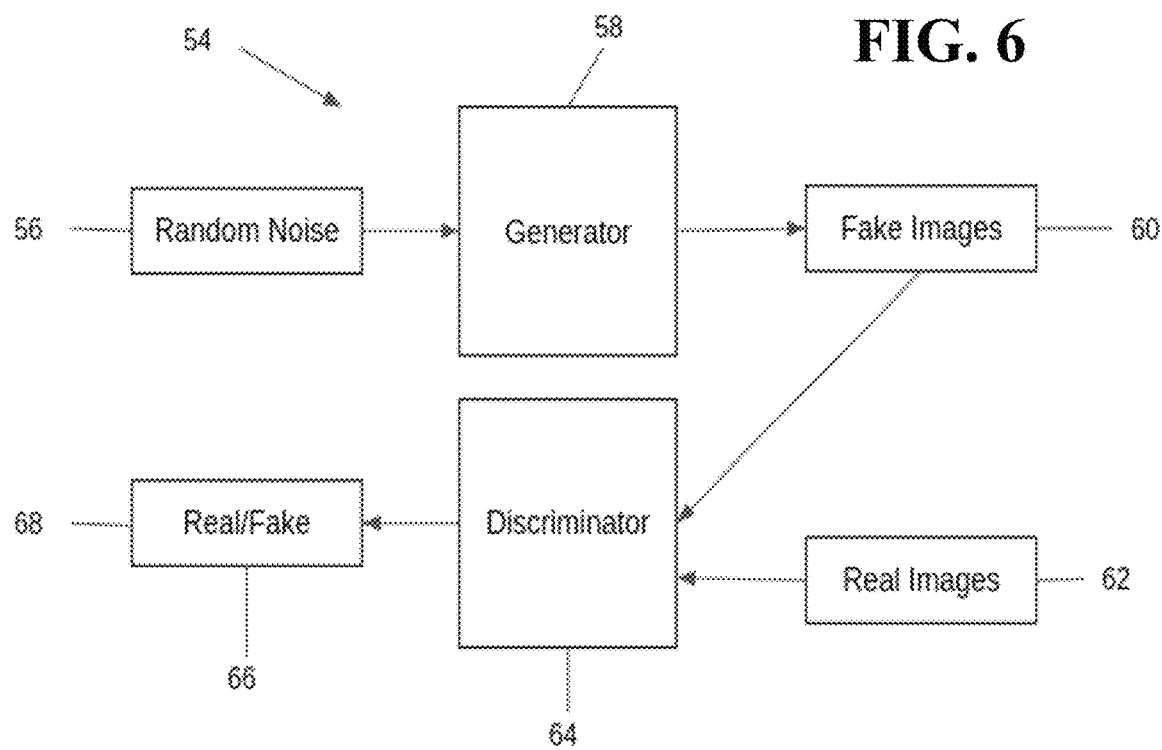
FIG. 6 shows a schematic view of example Generative Adversarial Networks (GANs) suitable for use with embodiments disclosed herein.

The preceding part 20 of the system includes various numbers of GAN networks. Generative Adversarial Networks are a category of machine learning and specifically deep learning networks. GANs use an unsupervised learning approach where the model can be trained on unlabeled samples. A more detailed example of GAN is demonstrated in FIG. 6. A GAN 54 typically includes two models, a generator 58 and a discriminator 64. The generator is a convolutional neural network which tries to produce real-looking images 60 from the given input noises 56. The discriminator 64 is also a Convolutional Neural Network which has a classifier in the last layer. This network is responsible for distinguishing generated images 60 from original images 62. Generally, the generator network is trying to generate samples which look like real images to fool the discriminator. After training this network, the generator network can be used for generating samples from the distribution of the training data.

In embodiments disclosed herein, each type of element may be assigned a separate GAN that outputs synthesized elements. For example, for an "academic paper" type document, different GANs may be used to generate author blocks, main text, figures, and the like.

The outputs of the GANs 20 may be combined with the color-coded layouts 18 as previously disclosed to generate a stream of artificial documents 22 based on the original documents using the various element types, as well as the annotations derived from the original documents. For example, the output of each GAN may be assigned a color corresponding to the associated portion of the layout 18, thereby resulting in artificial documents that are automatically annotated in the same fashion as the original documents, since the layout and generated elements are already color-matched to the original annotations.

The processes previously disclosed herein may be repeated for each page in the document, so that multiple layouts may be used, each of which may include some or all of the same elements or types of elements. When creating new synthetic documents, pages based upon each layout may be generated, with the types of elements incorporated into the pages of the synthetic documents being determined based upon the layout and annotations created for each page of the original document. Hence, the generated synthetic pages may have similar page structures to the original document, whether considered page-by-page or as a whole. In some embodiments, the generated documents may include documents that have identical layouts to the original document(s), and/or pages that have layouts that are similar but not identical to the layouts of the original document(s). Generally it may be preferred for the generated documents to have layouts that vary in specific arrangement and content to the original documents, even where the original corpus includes many documents, to further improve the usefulness of the generated documents in training machine learning and other subsequent systems. That is, it may be preferred to generate documents with a degree of likely diversity, i.e., having pages that aren't already available but that are very plausible to exist within a particular domain of pages of the same type.

Embodiments disclosed herein may be particularly useful for applications and domains in which the original documents may not be available for a document processor to access directly, and thus it is not possible for a conventional document processing system to build training data based on the original documents. It may be useful to process such documents for the same reasons as non-restricted documents, for example to identify steps in a process document and associated figures to modernize or convert the original process document to an updated format. As a specific example, a highly-secure document such as a network vulnerability assessment process or a document related to national security may need to be processed by the system, without being handled directly by non-authorized personnel such as outside users or developers, to convert the document to a new training system. More generally, as used herein, a "restricted-access" document or document corpus refers to one that only certain individuals or individuals meeting specific requirements such as security clearance, internal role or seniority, or the like, may access without violating corporate or governmental rules, regulations, or statutes. For such documents it may not be possible to obtain the original data from an original source, such as where the document was created by a now-defunct company, or where the original source material is not readily accessible to generate in a modern format such as XML or the like. Similarly, it may require more effort than is justified for a particular document to extract and re-format the data, especially where access to the original document is strictly limited for security or similar purposes. Other types of documents may be similarly access-restricted but may be updated fairly regularly; however, such documents may not be available in every desired form or in a specific desired format, but rather must be processed in whatever form the original author provides. For example, government contractors often provide documents in a form required by the original contract specifications, regardless of formats used by other systems that may use the regularly-updated documents. Embodiments disclosed herein allow for the generation of training documents based on the original, restricted-access documents, without requiring unauthorized persons or systems to access the original, restricted documents by connecting the restricted-access documents to synthesized documents as disclosed herein. Other types of documents may also benefit from embodiments disclosed herein in a similar fashion, such as those that would be prohibitively expensive or complicated to process and/or annotate manually.

For example, a party having legitimate access to a restricted-access document may run a system as disclosed herein and then provide the outputs as the synthesized documents. A subsequent document processor, such as those disclosed in U.S. Pat. No. 10,810,240, may then process the synthesized documents to create new tools which are then applied to the original documents by the authorized users. For example, a machine learning model trained on the synthesized documents may be provided back to the authorized user, who then runs the trained model on the original restricted-access documents.

More generally, embodiments disclosed herein are capable of generating any desired number and variance of training documents, either from a smaller corpus of labeled documents or a larger corpus of unlabeled (or mostly-unlabeled) documents. This also allows for embodiments disclosed herein to successfully generate a usable training corpus from documents having fewer labels than conventional machine learning systems, or no labels at all as previously disclosed.

Although the content of the present disclosure described an implementation of a complete system, the examples and details of the explained implementation should not be considered as restrictions on the system and should not be considered to limit the present disclosure beyond the scope and content of the disclosure, including the claims, provided herein.

What is claimed is:

1. A method of generating a document corpus, the method comprising:
    receiving an original document, wherein the original document is a restricted-access document having security requirements that restrict access to the original document;
    separating the original document into a plurality of pages;
    for a first page of the plurality of pages, performing a first sub-process comprising:
        converting the first page to an image;
        determining a layout of the first page, the layout indicating a location of a first element of the first page;
        assigning an element type to the first element; and
        based upon the element type, assigning the first element to an element cluster;
    based upon the element cluster, generating a plurality of generated elements of the same type as the first element;
    based upon the layout and the plurality of generated elements, generating a plurality of generated documents that include the generated elements, wherein the plurality of generated documents are not restricted-access documents and wherein no generated document duplicates the entirety of the original document; and
    training a machine learning system based upon the plurality of generated documents.

2. The method of claim 1, wherein the layout indicates locations of a plurality of elements of the first page.

3. The method of claim 1, further comprising performing the sub-process for a set of pages of the plurality of pages.

4. The method of claim 3, wherein the set of pages includes all pages in the plurality of pages.

5. The method of claim 3, wherein the plurality of generated documents is based on a plurality of layouts, each of the plurality of layouts determined for a page in the set of pages.

6. The method of claim 1, wherein the element type is represented by a color.

7. The method of claim 1, wherein each of the plurality of generated elements is generated by a generative adversarial network (GAN).

8. The method of claim 7, wherein a separate GAN is used to generate elements of each type of element identified in the document.

9. The method of claim 1, wherein the plurality of generated documents are generated based upon outputs of the separate GANs.

10. A system for generating a document corpus, the system comprising:
    a computer-readable data storage storing a plurality of documents; and
    a computer processor configured to:
        obtain an original document from the plurality of documents, wherein the original document is a restricted-access document having security requirements that restrict access to the original document;
        separate the original document into a plurality of pages;
        for a first page of the plurality of pages, perform a first sub-process comprising:
            converting the first page to an image;

determining a layout of the first page, the layout indicating a location of a first element of the first page;

assigning an element type to the first element; and based upon the element type, assigning the first element to an element cluster;

based upon the element cluster, generate a plurality of generated elements of the same type as the first element;

based upon the layout and the plurality of generated elements, generate a plurality of generated documents that include the generated elements, wherein the plurality of generated documents are not restricted-access documents and no generated document duplicates the entirety of the original document; and training a machine learning system based upon the plurality of generated documents.

11. The system of claim 10, the processor further configured to train a machine learning system based upon the plurality of generated documents.

12. The system of claim 10, wherein the layout indicates locations of a plurality of elements of the first page.

13. The system of claim 10, wherein the plurality of generated documents is based on a plurality of layouts, each of the plurality of layouts determined for a page in the set of pages.

14. A non-transitory computer-readable medium storing a plurality of instructions which, when executed by a computer processor, cause the processor to perform a method comprising:

receiving an original document, wherein the original document is a restricted-access document having security requirements that restrict access to the original document;

separating the original document into a plurality of pages;

for a first page of the plurality of pages, performing a first sub-process comprising:

converting the first page to an image;

determining a layout of the first page, the layout indicating a location of a first element of the first page;

assigning an element type to the first element; and based upon the element type, assigning the first element to an element cluster;

based upon the element cluster, generating a plurality of generated elements of the same type as the first element;

based upon the layout and the plurality of generated elements, generating a plurality of generated documents that include the generated elements, wherein the plurality of generated documents are not restricted-access documents and wherein no generated document duplicates the entirety of the original document; and training a machine learning system based upon the plurality of generated documents.

* * * * *